June 13, 1961 A. CARNEGIE, SR 2,987,827
VISUAL AID MATHEMATICS EDUCATIONAL DEVICE
Filed Sept. 6, 1960
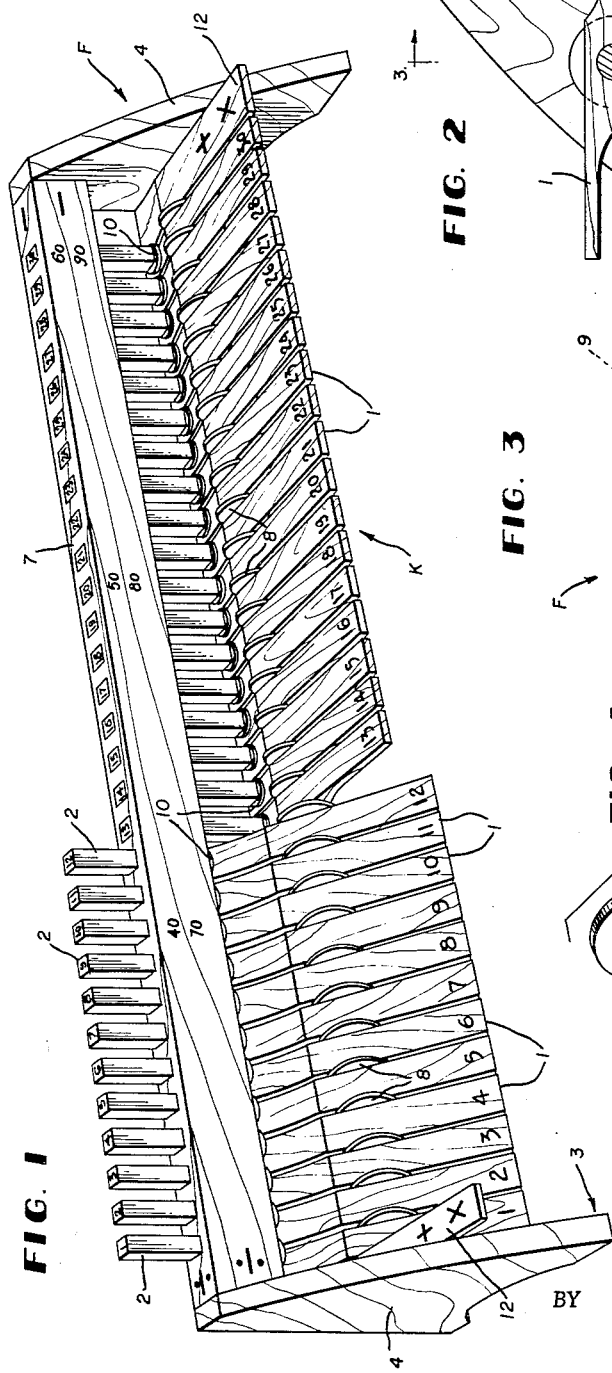
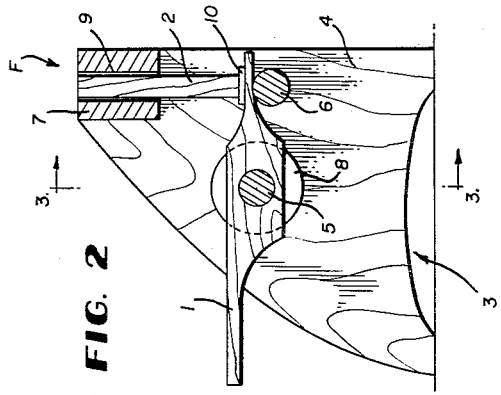
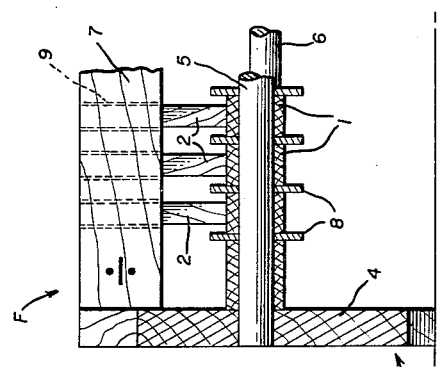
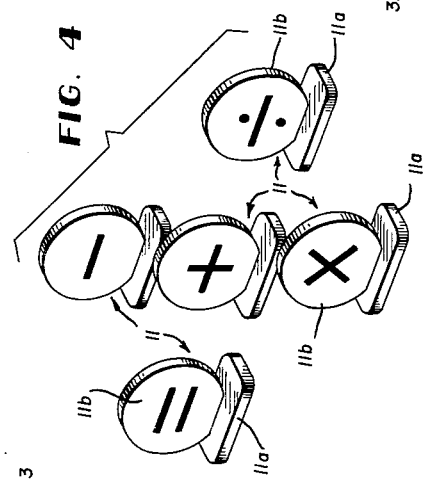
INVENTOR
ANDREW CARNEGIE, SR.
BY *Baldwin & Wright*
ATTORNEYS

United States Patent Office 2,987,827
Patented June 13, 1961

2,987,827
VISUAL AID MATHEMATICS EDUCATIONAL DEVICE
Andrew Carnegie, Sr., 517 Robinson Ave., Albany, Ga.
Filed Sept. 6, 1960, Ser. No. 54,065
4 Claims. (Cl. 35—6)

This invention relates to educational devices, and more particularly to devices for visually aiding pupils, especially very young children, in learning the performance of the basic arithmetical operations, addition, subtraction, multiplication and division; and, it may be added, for aiding teachers in giving instruction in this field, often so difficult because of the pupils' lack of interest. The device according to this invention is so constructed and is capable of being so used as to stimulate and maintain increased interest of even rather recalcitrant children by the aid of visual working of the device throughout performance of an arithmetical operation. This has been found to engender a feeling of participation in something in the nature of a game instead of what children may and often do seem to consider an abstract and boring or annoying task.

An object of the invention is to provide a visual aid mathematics educational device of the general class referred to, characterized by a cooperative arrangement of numbered operating parts capable of visually assisting the demonstrating and practicing of the several arithmetical operations, but which is so simple and easy to follow in use as not to defeat the purpose by tending to confuse rather than aid the pupil.

A further object of the invention is to provide a device of the character stated which is of such inexpensive construction as to be readily afforded by schools having to operate on very limited budgets, as is too often the case.

Other objects of the invention will become apparent from a reading of the following description, the appended claims, and the accompanying drawings, in which:

FIGURE 1 is a perspective view of a visual aid mathematics educational device embodying the invention;

FIGURE 2 is a transverse section taken just to the right of one of the key and indicator element pairs shown in FIGURE 1;

FIGURE 3 is a fragmentary longitudinal section on the line 3—3 of FIGURE 2; and

FIGURE 4 is a group perspective view of a set of loose pieces bearing arithmetical sign indicia.

Considered in its overall nature, the illustrative embodiment of the invention includes a frame generally designated F, a keyboard generally designated K comprising an array of consecutively numbered keys 1 mounted to move from non-operated to operated positions and vice versa, and an array of correspondingly numbered indicator elements 2 mounted on the frame for movement by the keys from non-indicating positions to indicating positions, and for movement by direct actuation from indicating positions to non-indicating positions. As shown in FIGURE 1, twelve keys, those numbered "1" to "12," are depressed to operated positions, the keys numbered "13" to "30" being in non-operated positions. Correspondingly, the indicator elements 2 respectively associated with the depressed keys 1 and correspondingly numbered "1" to "12" are shown in their raised or indicating positions, the remaining elements 2, namely those marked "13" to "30," being in their depressed or non-indicating positions. By the influence or operation of means to be described later, any keys, once depressed at their front ends will be yieldably held in depressed positions and the associated indicator elements 2 held in raised positions. In order to return the depressed keys 1 and the elevated indicator elements 2 to their non-operated and non-indicating positions, the indicator elements 2 are simply pushed downwardly.

With more particular reference to the construction of the device, the frame F may be considered as comprising the entire stationary portion of the device which includes a base 3, itself constituted by end plates 4, 4, connected in spaced relation by a horizontal pivot rod 5 and a horizontal tie rod 6 extending to the rear of and parallel to the pivot rod 5. Also forming part of the frame is a guide bar 7 which extends between the upper portions of the two end plates 4, thus contributing additional rigidity to the frame as well as serving to mount the indicator pegs 2 in a manner hereinafter described. The pivot rod 5 serves as a common member for rockably mounting all of the keys 1 and may, for providing the necessary rigidity, be formed of metal. The tie rod 6, not having to sustain any operating load, may be formed of wood for lightness, if desired.

The keys 1 are linearly deployed along the pivot rod 5 and have enlarged central portions, shown in Figure 5, through which the common pivot rod 5 extends with sufficient clearance to enable the keys to rock on the rod 5 without substantial binding, the keys nevertheless fitting the rod snugly enough to prevent wobbling. In order yieldably to maintain the keys in the positions to which they have been moved, either non-operated or operated, spacer washers 8 are interposed between adjacent keys and are made fast with the pivot rod 5 as by being press fitted on the rod or by any other suitable expedient, the washers 8 engaging the adjacent keys with sufficient pressure to exert the frictional resistance to rocking of the keys required to hold them yieldably in any position to which they may have been moved, the pressure, however, being insufficient substantially to prevent easy manual movement of the parts. Rocking of the keys 1 to their non-operated positions is limited by engagement of the key rear ends with the tie rod 6, as shown in FIGURE 2.

The guide bar 7 is formed with an array of linearly deployed guide openings 9, extending downwardly toward the rear ends of the respective keys 1. The guide openings 9 provide for mounting of the indicator elements 2, formed as pegs, for vertical sliding movements directly above the key rear ends, with the lower ends of the pegs in one-way driving contact with the key rear ends. Preferably, the pegs fit in the guide openings 9 with sufficient clearance to permit the pegs to slide vertically quite freely, so that the sole frictional resistance required to be overcome in operating the parts is that due to the contact of the washers 8 with the keys. Downward movement of the indicator pegs to their non-indicating positions is limited by the contact of the peg lower ends with the rear ends of the keys, the lowermost positions of which are in turn limited by the tie rod 6. Consequently, it is not possible for the pegs 2 to be withdrawn downwardly from the guide openings 9. In order to prevent withdrawal of the pegs 2 upwardly from the guide openings 9, the lower ends of the pegs are provided with contact buttons 10 which are greater in horizontal dimension than the pegs 2 and openings 9, so that the buttons 10 will engage the bottom of the guide bar 7 and prevent lifting of the pegs completely through the guide openings 9.

While the pegs are desirably freely slidable vertically in the guide member 7, it is important that the pegs be prevented from turning within their guide openings 9, otherwise the numerals on the tops of the pegs 2 could be turned upside down, so to speak. Accordingly, the pegs 2 and guide openings 9 are so co-relatively shaped as to constrain the pegs against being turned. In the form shown, the pegs and guide openings are correspondingly angular in cross section, and specifically rectangular or square in cross section.

It being borne in mind that the general purpose of the device includes the familiarizing of pupils with arithmetical operations and consequently with the conventional signs which designate these operations, it is desirable to provide for a designation of the particular operation to be demonstrated by the teacher or practiced by a pupil. In FIGURE 4 there is illustrated a group of operation designating loose pieces generally designated 11 and respectively bearing the signs +, −, ×, and ÷, and additionally an "=" sign. Each loose piece 11 comprises a base or foot 11a fast with and extending upwardly from which is a tab 11b bearing the designation. It is contemplated that when a particular operation is to be performed, the loose piece designating that operation is to be placed upon the frame over or in conjunction with a sign on the frame corresponding to that on the selected loose piece. As shown in FIGURE 1, the addition and multiplication signs are displayed on fixed parts 12 of the frame at both ends of the latter, and the division and subtraction signs are displayed respectively on the left and right ends of the frame.

The outlining of several typical instructional or practice operations with the aid of this device may be of assistance. Taking a most simple case, a single column of numbers, say 6, 3 and 3, is to be added. The loose piece bearing the "+" sign is placed on the frame over one of the plus designations thereon so that as the operation proceeds the pupil will be reminded constantly that he or she is adding. Then the pupil, presumably having learned to count, presses down six keys (the first number to be included in the addition), and then subsequently three more keys and again three more keys, beginning, of course, at the left with the key numbered "1." The answer, or sum, will be indicated by the number on the last or rightmost raised peg, which, as shown in FIGURE 1, will be the peg numbered "12."

Suppose now that the numbers 8, 9, 7, 8 and 5, in a single column, are to be added. The sum, of course, will be 37, which is beyond the capacity of the thirty key and peg device. Again the procedure is to start at the left with the "1" key and first press down eight keys in succession, then nine keys in succession, and so on. When the "30" key has been depressed, the pupil will continue the count by depressing raised pegs 2, beginning with the "1" peg at the left of the keyboard and continuing until all of the digits to be added have been counted off. In this example the counting will end with the "7" peg depressed. The pupil then should know that the sum is 30 (the highest number in the array of keys) and 7 (the number of the last peg returned to depressed position), i.e. 37.

Considering another example, say one in which the sum of a single column of digits will be 45, depression of all thirty keys followed by depression of the number of elevated pegs required to exhaust the count will end with depression of the "15" peg. Reading of the answer —45— is facilitated by placement of an extension number 40 on the guide adjacent the peg 10. The pupil can readily see that the answer is 40 (indicated by the extension number) and 5 (the number of pressed down pegs to the right of the extension number), i.e. 45. There are other extension numbers adjacent other pegs bearing numerals which are multiples of 10. Each extension number shown at the top in FIGURE 1 is the sum of 30 and the number on the adjacent peg. Thus, the extension number 40 is adjacent the 10 peg, the extension number 50 is adjacent the 20 peg, and so on. For use in cases in which the sum exceeds 60, a set of lower extension numbers is provided, the number 70 being under the extension number 40 and opposite the peg 10, and so on.

In adding a plurality of columns of figures, the units column is first added in the manner explained above, and if the sum of that column exceeds 9, the last digit only of that sum is written below the units column and the 10's digit in the first column sum is carried into the tens column whose digits are then added in a similar manner.

In subtracting, say 4 from 8, the minuend 8 is set into the keyboard by depressing all of the keys numbered "1" to "8" and raising the correspondingly numbered pegs. The pupil then deducts the subtrahend 4 by depressing four raised pegs beginning at the right of the set of raised pegs. The numeral 4 on the rightmost peg remaining in raised position will be the result.

In subtraction, if the subtrahend in a column is larger than the minuend in that column, 10 ones are borrowed from the next column to the left. For example, to subtract 23 from 32, first depress twelve keys beginning at the left and then depress three pegs beginning at the right. The answer will be 9, as shown on the last peg left standing.

To multiply, say 6×4, press six keys down four times, and the result, of course, will be indicated by the "24" on the last key depressed.

Division operations may also be performed by following a procedure which may be particularly engaging to the more accomplished pupils. For example, to divide 12 by 3, with all of the keys in non-operated positions, first press down three keys, representing the divisor. Then press down the last of the three pegs raised to indicating positions, that is the "3" peg. Then, beginning with the next key, i.e. the "4" key, press down three more keys and depress the last elevated peg, now the "6" peg. Then repeat the operation, pressing down the "7," "8" and "9" keys and returning the "9" peg to its non-indicating position. Finally, depress the next three keys, ending with the "12" key (the dividend) and depress the last raised peg "12." The number of pegs which have been depressed will be the quotient, in this case "4."

The elementary arithmetical operations described above may seem so simple and obvious as not to require the assistance of any calculating device. However, the teaching aid advantages of devices in accordance with the invention, in stimulating and maintaining interest in the subject, are not to be discounted. While a device constructed and operated in accordance with the invention is particularly suited for use as a visual aid in instructing young pupils, it may be used as an amusement device by adults, albeit it is not pretended that it has particular utility in performing calculations, as such.

The disclosed construction embodies the invention in a preferred form, but it is intended that the disclosure be illustrative rather than definitive, the invention being defined in the claims.

I claim:

1. In a visual aid mathematics educational device, a base; a keyboard comprising an array of numbered keys; a single pivot rod mounted on said base and mounting said keys for rocking movements; spacers fixed to said pivot rod respectively between adjacent keys and frictionally engaging said keys for yieldably holding the keys in operated and non-operated positions; a guide on said base formed with an array of guide openings extending respectively toward said keys remote from said pivot rod; and an array of indicator elements numbered correspondingly to said keys and being mounted to slide in said openings respectively, and to be operable by said keys.

2. In a visual aid mathematics educational device, a base; a keyboard comprising an array of numbered keys; a single pivot rod mounted on said base and mounting said keys for rocking movements; spacers fixed to said pivot rod respectively between adjacent keys and frictionally engaging said keys for yieldably holding the keys in operated and non-operated positions; a guide on said base formed with an array of guide openings extending respectively toward said keys remote from said pivot rod; and an array of indicator elements numbered correspondingly to said keys and being mounted to slide in said openings respectively, and to be operable by said keys, said openings and said indicator elements being so co-relatively formed as to prevent turning of said indicator elements within said openings while permitting free sliding movement of said indicator elements in the openings.

3. In a visual aid mathematics educational device, a base; a keyboard comprising an array of numbered keys; a single pivot rod mounted on said base and mounting said keys for rocking movements; spacers fixed to said pivot rod respectively between adjacent keys and frictionally engaging said keys for yieldably holding the keys in operated and non-operated positions; a guide on said base formed with an array of guide openings extending respectively toward said keys remote from said pivot rod; and an array of indicator elements numbered correspondingly to said keys and being angularly shaped in cross section correspondingly to said openings and mounted to slide in said openings respectively, and to be operable by said keys.

4. In a visual aid mathematics educational device, a horizontal base; a keyboard comprising an array of keys; a horizontal pivot rod on said base mounting said keys to rock about a common axis traversing the keys between their front and rear ends; means on said pivot rod for frictionally holding the keys in operated and non-operated positions; numeral indicia on the fronts of said keys; a guide on said base extending parallel to said pivot rod to the rear thereof and over the rear ends of the keys, and being formed with an array of guide openings, angular in horizontal cross section, and respectively being disposed above the key rear ends; an array of indicator pegs shaped correspondingly to said guide openings in horizontal cross section and being mounted to slide freely in said openings respectively and having at their lower ends contact buttons in one-way driving contact with the tops of the respectively associated key rear ends, whereby movement of a key from non-operated to operated position effected by depression of the key front end will raise the associated indicator peg to indicating position and returning of the key to non-operated position will enable lowering of the raised peg to non-indicating position, said contact buttons extending horizontally beyond the associated pegs and being larger in horizontal dimension than said guide openings whereby said contact buttons are engageable with said guide for limiting raising of said indicator pegs and preventing displacement of said indicator pegs from said guide openings; and numeral indicia on said indicator pegs corresponding to the indicia on the respectively associated keys.

References Cited in the file of this patent

UNITED STATES PATENTS

| | | |
|---|---|---|
| 925,716 | McAnulty | June 22, 1909 |
| 2,804,699 | Robinson | Sept. 3, 1957 |

FOREIGN PATENTS

| | | |
|---|---|---|
| 598,873 | Great Britain | Feb. 27, 1948 |
| 804,741 | Great Britain | Nov. 19, 1958 |